United States Patent [19]

Urata et al.

[11] Patent Number: 5,541,665
[45] Date of Patent: Jul. 30, 1996

[54] IMAGE PROCESSING APPARATUS WITH CHANGE OVER OF CLOCK SIGNALS

[75] Inventors: Hiroyuki Urata, Yokohama; Masahiro Eto, Mobara; Atsushi Maruyama, Yokohama; Fumio Inoue, Yokohama; Masanori Ogino, Yokohama; Kiyoshi Yamamoto, Yokohama; Kazutaka Naka, Yokohama; Masaaki Iwanaga, Yokohama, all of Japan

[73] Assignee: Hitachi, Ltd., Tokyo, Japan

[21] Appl. No.: 362,241

[22] Filed: Dec. 22, 1994

[30] Foreign Application Priority Data

Dec. 22, 1993 [JP] Japan .................................. 5-324463
Dec. 24, 1993 [JP] Japan .................................. 5-326907

[51] Int. Cl.⁶ .......................... H04N 5/00; H04N 7/015; H04N 7/46
[52] U.S. Cl. ...................... 348/571; 348/537; 348/715; 348/573; 348/424; 348/392
[58] Field of Search .................................. 348/715, 716, 348/717, 714, 718, 537, 539, 536, 513, 514, 572, 573, 424, 427, 392, 555, 556, 558, 428, 429, 231, 497, 499, 472, 471, 571, 425; 358/320, 337, 339; H04N 5/00, 9/64, 7/015, 9/79, 11/04, 7/00, 7/46

[56] References Cited

U.S. PATENT DOCUMENTS

| 4,120,000 | 10/1978 | Ninomiya | 348/513 |
|---|---|---|---|
| 4,163,248 | 7/1979 | Heitmann | 348/572 |
| 4,589,020 | 5/1986 | Akatsuka | 348/718 |
| 4,626,827 | 12/1986 | Kitamura et al. | 348/424 |
| 4,646,136 | 2/1987 | Kouyama | 348/513 |
| 4,843,471 | 6/1989 | Yazawa et al. | 348/718 |
| 4,958,228 | 9/1990 | Kutsuki | 348/536 |
| 5,045,951 | 9/1991 | Kimura et al. | 358/445 |
| 5,057,924 | 10/1991 | Yamada et al. | 348/231 |
| 5,111,300 | 5/1992 | Nam | 348/231 |
| 5,325,189 | 6/1994 | Mimura | 348/231 |

FOREIGN PATENT DOCUMENTS

| 61-157029 | 7/1986 | Japan | H03M 1/12 |
|---|---|---|---|
| 63-125020 | 5/1988 | Japan | H03M 1/12 |
| 02067883 | 3/1990 | Japan | H04N 5/91 |
| 02166495 | 6/1990 | Japan | G09G 5/12 |
| 04323973 | 11/1992 | Japan | H04N 5/225 |
| 9203020 | 2/1992 | WIPO | 348/572 |

*Primary Examiner*—Safet Metjahic
*Attorney, Agent, or Firm*—Antonelli, Terry, Stout & Kraus

[57] ABSTRACT

In order to enable sampling of high definition still video signals in addition to common video signals, a function is added for sampling video signals with every other plurality of picture elements as an interval to an image processing apparatus without using a sampling circuit which requires high speed operations. The invention is also intended to change over between two circuits that is, a circuit for using a picture element clock regenerated by a PLL circuit as a sampling clock for analog to digital converters and a circuit for using a clock obtained by dividing the picture element clock as a sampling clock for the analog to digital converters to sample video signals with every other plurality of picture elements as an interval. Thus, it is possible to carry out sampling of high definition video signals with high frequencies in addition to common video signals without necessity of raising the operating speed of the sampling circuit.

20 Claims, 10 Drawing Sheets

UPPER STAGE : FIRST FIELD
LOWER STAGE : SECOND FIELD

UPPER STAGE : FIRST FIELD
LOWER STAGE : SECOND FIELD

IMAGE PROCESSING APPARATUS WITH CHANGE OVER OF CLOCK SIGNALS

FIELD OF THE INVENTION

The present invention relates to an image processing apparatus for processing video signals, such as those used in HDTV (High Definition Television) and NTSC (National Television Systems Committee) systems and for displaying images on a display unit. More particularly, the invention relates to an image processing circuit capable of changing over a plurality of sampling methods in a sampling circuit which generates data from video signals and of processing both high definition still video signals and animation video signals.

BACKGROUND OF THE INVENTION

In conventional image processing circuits, it has been necessary to raise the operating speeds of an analog to digital converter, a memory control circuit and other circuits as the frequencies of the video signals have been increased, since the video signals are analog to digital converted using a picture element clock. Conventionally, for sampling those signals of high frequencies, it has been proposed to use a method for sampling the signals in a plurality of fields as disclosed in Japanese Patent Application Disclosure Gazette (kokai) No. SHO. 61-157029 or a method for sampling the signals by using a plurality of analog to digital converters as disclosed in Japanese Patent Application Disclosure Gazette (kokai) No. SHO. 63-125020, in order to lower the operating speed of the analog to digital converter. In addition, a video printer which permits processing of high definition still pictures has been described in Japanese Patent Application Disclosure Gazette (kokai) No. HEI. 2-67883.

An apparatus which permits only one video input unit, such as a TV camera, to handle differently formatted video signals such as high definition still video signals and animation video signals, has been disclosed in Japanese Patent Application Disclosure Gazette (kokai) No. HEI. 4-323973 whereby means for handling a plurality of pictures is used in the imaging part which changes over between an animation picture and a high definition still picture.

Since the above prior art has required an input of still video signals as a precondition, the prior art could have not accomodate the input of animation video signals. To enable the input of animation video signals, a high speed analog to digital converter and a signal processing circuit which requires high speed operation have been required for inputting high definition still video signals with high frequencies. Therefore, there have been problems such as an increase of power consumption of circuit elements for high speed operation and the expansion of the scale of various circuits along with use of high speed devices, such as ECL (Emitter Coupled Logic Circuit).

In a conventional method which has carried out sampling for each picture element by directly using a picture element clock as a sampling clock for the analog to digital converter, the sampling circuit has been required to operate at a high speed for high definition still video signals. Alternatively, in the case of a method for sampling the signals in a plurality of fields or a method for sampling the signals by means of a plurality of analog to digital converters, low frequency animation video signals could not be processed even though high frequency high definition still video signals could be processed. In addition, in the method for sampling the signals by using a plurality of analog to digital converters typically, the analog to digital converters have respectively different characteristics and therefore it has been impossible to avoid deterioration of the image quality with such an arrangement.

SUMMARY OF THE INVENTION

An object of the present invention is to provide an image processing circuit which is capable of sampling high frequency high definition still video signals, in addition to sampling animation video signals, and of processing an image with the use of less power by reducing the operation speed thereof.

Moreover, it is necessary to take into account the possibility that the frequency at which a memory will be operable is lower than the frequency of a picture element clock of a video signal, such as in a conventional image processing apparatus.

In addition, the present invention is intended to provide an image processing circuit which is capable of attaining the above object in a case of processing video signals by converting the video signals, which have been digitally converted, to parallel signals to reduce the operating frequency of the memory, while taking into account a case in which the frequency at which a memory is operable is lower than the frequency of the picture element clock of the video signal, such as in a conventional image processing apparatus.

To attain the above object, the image processing circuit, which carries out sampling and analog to digital conversion of video signals, stores the signals in a memory, reads out image data from the memory, processes an image and converts digital data to analog data, is provided with a clock divider for dividing the picture element clock and a phase shifter for shifting the phase of the divide clock for each vertical sync signal in a latter stage of a PLL (Phase Locked Loop) circuit which regenerates the picture element clock according to a horizontal sync signal of the video signal and a means for selecting a clock which is obtained by shifting as much as specified the phase of the divide clock obtained by dividing the picture element clock in accordance with a frequency level of the picture element clock or the picture element clock from the PL circuit as an operation clock for the sampling circuit. In other words, an input side clock generation circuit is provided with means for dividing the picture element clock of input video signal in accordance with the frequency thereof, means for shifting the phase of the divide clock for each vertical sync signal, and means for selecting a clock to be used as an operation clock of the sampling circuit.

Memories which have respective capacities for a plurality of fields are prepared, and a means is provided for storing image data in respective memories for respective fields when high definition still video signals are sampled for a plurality of fields, picking up the image data from the respective memories in the order of pixels which have fetched the image data and obtaining the same video signals as input signals through parallel to serial conversion. In the case of sampling in one field, the sampled data is stored in the field memory and the data is taken out from the memory in the sequence of storage. A high speed digital to analog converter capable of operating with the picture element clock of the input signal is used.

To meet a lower speed at which the memory is operable than the speed of the picture element clock of video signal after digital conversion, a serial to digital converter part for parallel-converting video signals to an n phase and a switch for rearranging image data after parallel conversion are provided in the latter stage of the analog to digital converter part to make the memory operate in parallel with a 2n phase. In this case, a write control circuit is provided with means for writing video signals of the n phase in terms of the n phase after serial to parallel conversion in the memories with 2n phases.

In the present invention, both means are provided for sampling video signals for each picture element in accordance with the frequency level of the video signal and for using the picture element clock by dividing it and sampling the video signals at an interval of a certain number of pixels and therefore the sampling is carried out for respective pictures as conventional in a case where low frequency animation video signals are to be inputted, and sampling is enabled without operating the sampling circuit at a high speed even in a case where high frequency high definition still video signals are to be inputted. In other words, for entry of high definition still video signals, the operating speed of the analog to digital converter can be slowed down by dividing the picture element clock from the PLL circuit and using the divide clock as a sampling clock. Consequently, the frequency of use of high speed devices such as the ECL is reduced, resulting in reduction of power consumption of the circuits. In addition, the sampling position of video signals can be shifted for each field by a function for shifting the phase of sampling frequency for each vertical sync signal and therefore sampling of all pixels is possible in a plurality of fields. Data read out from the memories is rearranged so that the data is arranged in the sequence of images of the original picture, and the image data can be outputted without deteriorating the picture quality to be worse than the input picture by using a digital to analog converter capable of operating with a frequency of input signals.

In addition to the above effect, even in a case that the frequency available for operation of the memories is lower than the frequency of input picture element clock to be sampled, simple parallel to serial conversion can be carried out without a plurality of different sampling means according to the present invention by converting image data to the n phase in the serial to parallel conversion part and setting the data read out from the memories at the 2n phase at all times in the image processing circuit which controls the memories in 2n phase parallel processing after analog to digital conversion.

The present invention enables sampling of high definition video signals with a frequency for high speed operation in addition to common video signals and processing of images by providing means for sampling video signals which are thinned for every plurality of pixels and generating one scene of picture in a plurality of fields and means for changing over the sampling method in accordance with the frequency level of input signals.

DETAILED DESCRIPTION OF THE INVENTION

A first embodiment according to the present invention is described below, referring to FIG. 1.

Figure 1:
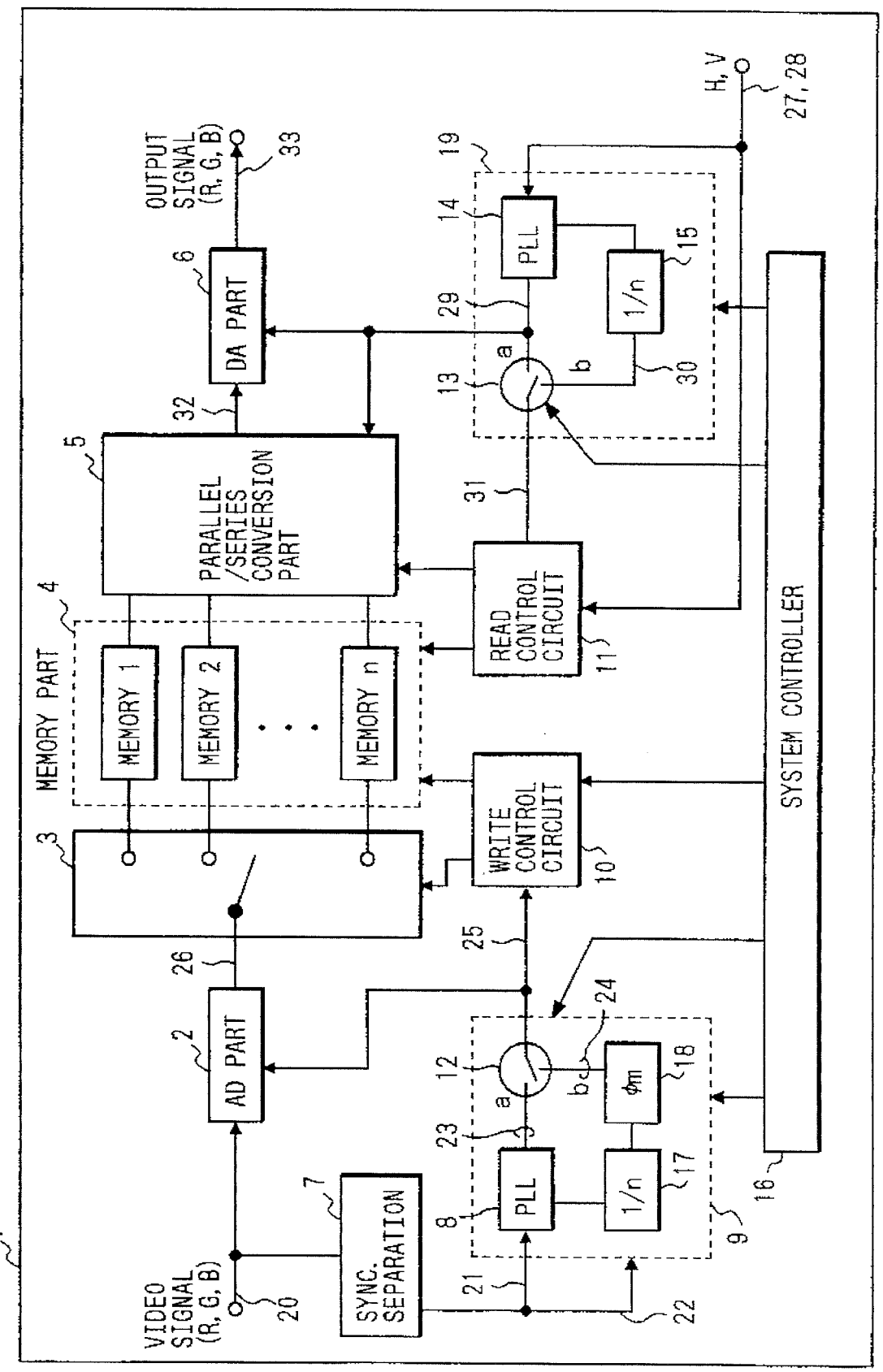
FIG. 1 is a schematic circuit diagram showing a first embodiment according to the present invention.

FIG. 1 is a block diagram of an image processing circuit for expansion signal processing forming an embodiment of this invention. The image processing circuit 1 comprises an analog to digital converter 2 for converting analog signals to digital signals, a memory selection switch 3 for selecting a memory into which video signals are to be written, a memory part 4 consisting of n field memories, a parallel to serial converter 5 for converting parallel signals to a serial signals, and a digital to analog converter 6 for converting digital signals to analog signals, which form an output synchronous separation circuit 7 picks up a horizontal sync signal 21 and a vertical sync signal 22 from the video signal 20, and supplies these signals to an input side clock generator 9. The clock generator 9 comprises a PLL circuit 8 for regenerating a picture element clock 23, a clock divider 17 for n-dividing the picture element clock according to the horizontal sync signal 21, a phase shifter 18 for shifting the phase of a picture element clock 23 regenerated from the clock divider 17 as much as 360/n, a switch 12 for changing over the sampling clock according to the frequency of the picture element clock 23. A write control circuit 10 is responsive to the sampling clock 25 for controlling the writing of data into the memory part of, and a read control circuit 11 operates to control reading of video data from the memory part 4. An output side clock generator comprises a PLL circuit 14 for regenerating a picture element clock 29 from an output side horizontal sync signal 27, a clock divider 15 for n-dividing the picture element clock 29, and a switch 13 for changing over the sampling clock according to the frequency of the picture element clock. A system controller 16 is provided for generating instructions to respective control circuits. In this case, the switches 12 and 13, respectively, select a terminal a when the frequency of the picture element clock of the input video signal is lower than the frequency of the operation clock of the analog to digital converter and select a terminal b when it is higher than the frequency of the operation clock. The input signals include a video signal 20, the horizontal sync signal 27 and the vertical sync signal 28 of the video output display.

The operation based on FIG. 1 is described below.

In the PLL circuit 8, the picture element clock 23 of the video signal is regenerated from the horizontal sync signal 21, which has been inputted from an input signal source and synchronously separated in the synchronous separation circuit 7. This picture element clock 23 is divided into a clock to be directly coupled to the switch 12 and a clock to be coupled to the switch 12 through the clock divider 17 and the phase shifter 18. The sampling circuit generator 9 n-divides ($n$ is an integer) the picture element clock 23 and shifts the phase by $360/n$ for each vertical sync signal 22. The switch 12 selects the terminal a and outputs the picture element clock 23 when the frequency of the picture element clock 23 of the input signal source is lower than a frequency with which the analog to digital converter is operable, and selects the terminal b and outputs the divided clock 24 when the frequency of picture element clock 23 of the input signal source is higher than a frequency with which the analog to digital converter is operable. The sampling clock 25 selected by the switch 12 is used as a Sampling clock for the analog to digital converter 2 and an operation clock for the write control circuit 10. Image data 26 converted from analog to digital by the analog to digital converter 2 is written into a memory of the memory part 4 selected for each field by the switch 3 in the sequence of memory 1, memory 2, . . . , memory $n$.

Figure 2:
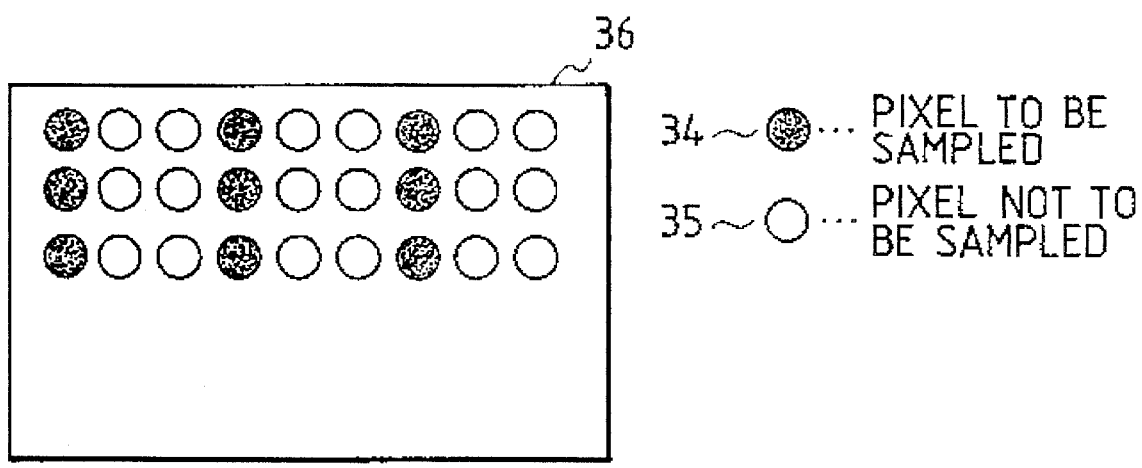
FIG. 2 is a diagram illustrating a sampling method.
Figure 3:
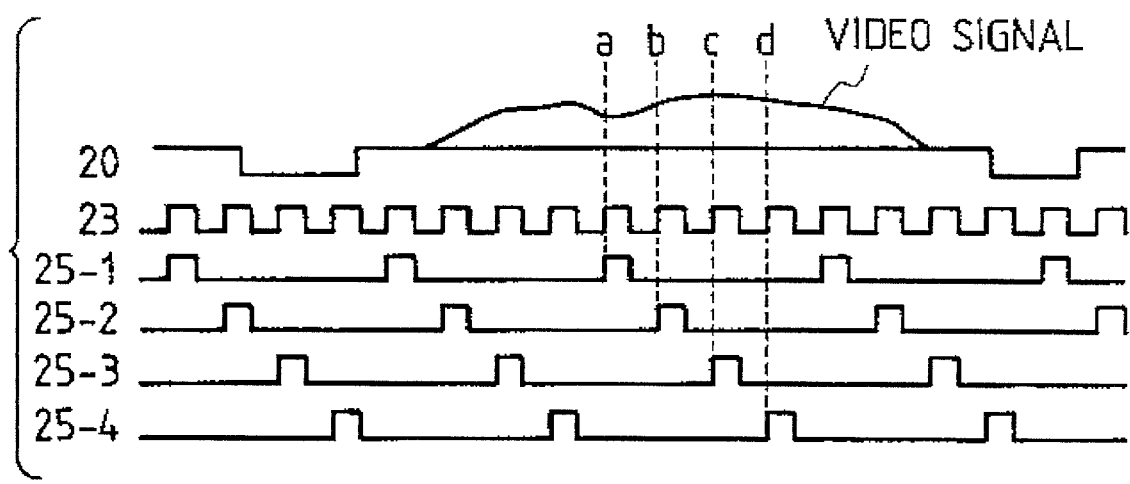
FIG. 3 is a timing diagram illustrating operation in FIG. 1.

In a case where the frequency of the picture element clock 23 of the input video signal is higher than the operable frequency for the analog to digital converter, the video data to be stored in the memory of the scene 36, that is, pixels 34 to be sampled, are interleaved between $n$ number of pixels 35, which are not to be sampled in the scene on a screen 36 as shown in FIG. 2 since the sampling clock 25 is the divided clock 24 obtained by dividing the picture element clock 23. However, the phase of the divided clock 24 is shifted for each field, as shown in FIG. 3, and consequently the video data of one scene is sampled after $n$ fields.

On the other hand, as regards the output side operation, the picture element clock for output 29 regenerated from the output side horizontal sync signal 27 by the PLL circuit 14 is used as the sampling clock for the digital to analog converter 6 and the operation clock for the parallel to serial converter 5. The picture element clock 29 is divided into a clock which will be directly inputted into the switch 13 and a clock which will be inputted into the switch 13 through the clock divider 15. In this case, the clock divider 15 serves to n-divide the picture element clock 29. The switch 13 selects the terminal a and outputs the picture element clock for 29 when the frequency of picture element clock 23 of the input signal source is lower than a frequency with which the analog to digital converter is operable, and selects the terminal b and outputs the divided clock 30 when the frequency of picture element clock 23 of the input signal source is higher than a frequency with which the analog to digital converter is operable. The clock outputted from the switch 13 is used as a read clock 31 for the memory and the read clock 31 is inputted to the read control circuit 11.

When reading out data from the memory, read control is carried out by selectively using two kinds of reading methods, according to the frequency level of input video signals, as described below.

If the frequency of the input video signal 20 is lower than the operable frequency for the analog to digital converter, the data is read out from the memory in the sequence of writing, that is, in the sequence of memory 1, memory 2, . . . , memory $n$, for each vertical sync signal for output. Image data 32 read out from the memory is converted to analog signals by the digital to analog converter 6 and outputted. In this case, the picture element clock for reading out the image data 32 is the read clock 31.

On the other hand, if the picture element clock of input video signal 20 is higher than the operable clock of the analog to digital converter, image data from $n$ memories are read in the same phase according to the read clock 31 and the image data read out is inputted to the parallel to serial converter 5. In this case, the pixels fetched with every plurality of pixels left are rearranged in the sequence of pixels of the input video signals. Image data rearranged by the parallel to serial converter 5 is converted to an analog signal in the digital to analog converter 6 and outputted as the output signal 33. In this case, the digital to analog converter which is operable with the picture element clock of the input video signal 20 is used and should be able to output video signals which are equivalent to the input video signals.

Figure 4:
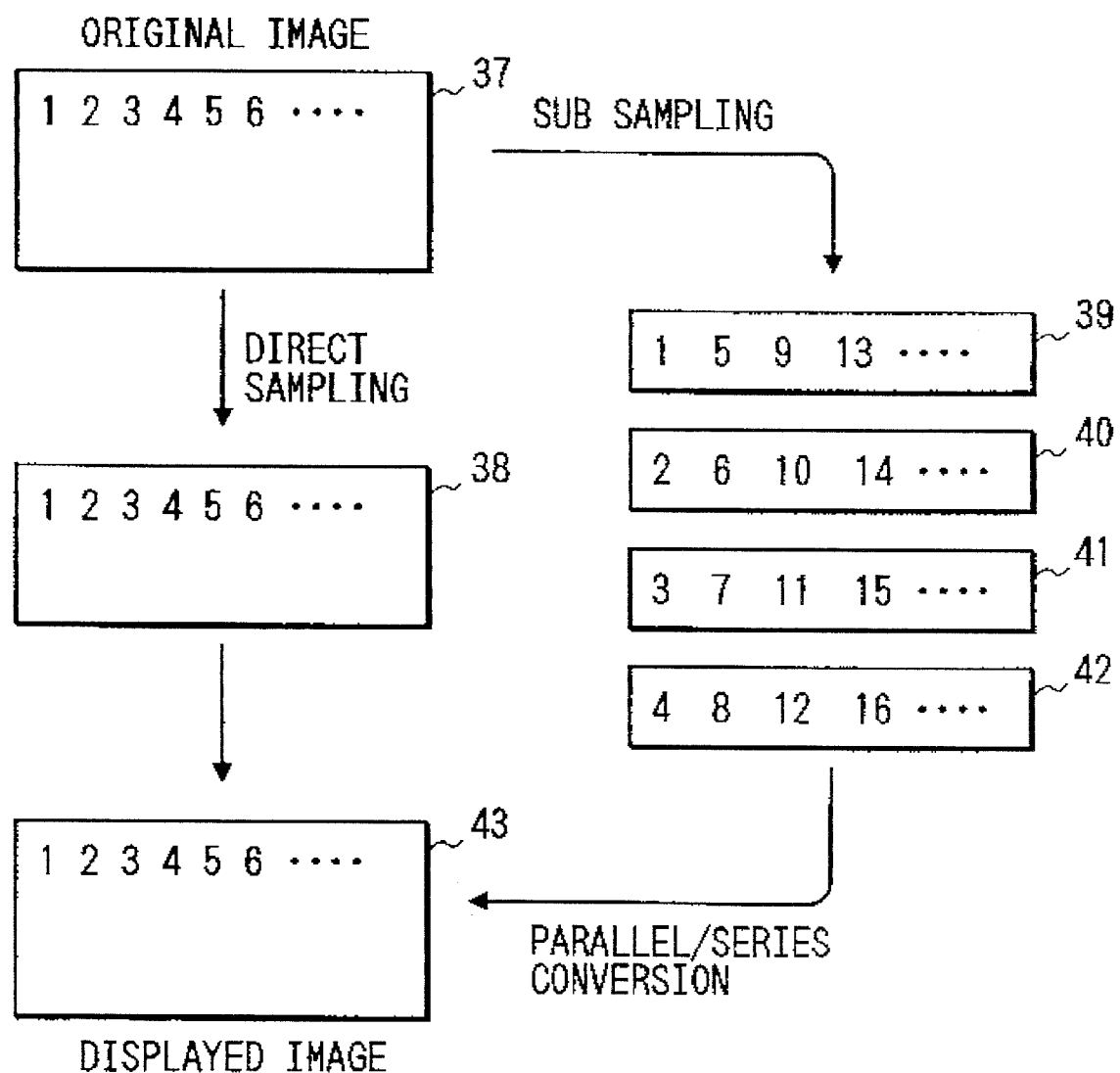
FIG. 4 is a diagram illustrating operation according to the present invention.

The flow of the above embodiment can be summarized as shown in FIG. 4.

In a case where the picture element clock of the video signal of an original picture 37 is slower than the operation clock of the analog to digital converter (in case of direct sampling), the picture element clock is directly used as a sampling clock for the analog to digital converter, and therefore data is inputted in sequence as picture element data 38 in the memory. On the other hand, in a case where the speed of the picture element clock of the video signal of the original picture 37 is faster than the operating speed of the analog to digital converter (in case of sub sampling), a sampling method for sampling data with an interval of a plurality of picture elements is used and the picture element data is subjected to thinning as from picture elements 39 to 42. Accordingly, in the former case, data is read out in sequence directly from the memories to display an image 43, while, in the latter case, a plurality of data is simultaneously read out from the memories and the image data is converted in the original sequence by parallel to serial conversion to display the image 43.

A second embodiment will be described with reference to FIG. 5.

Figure 5:
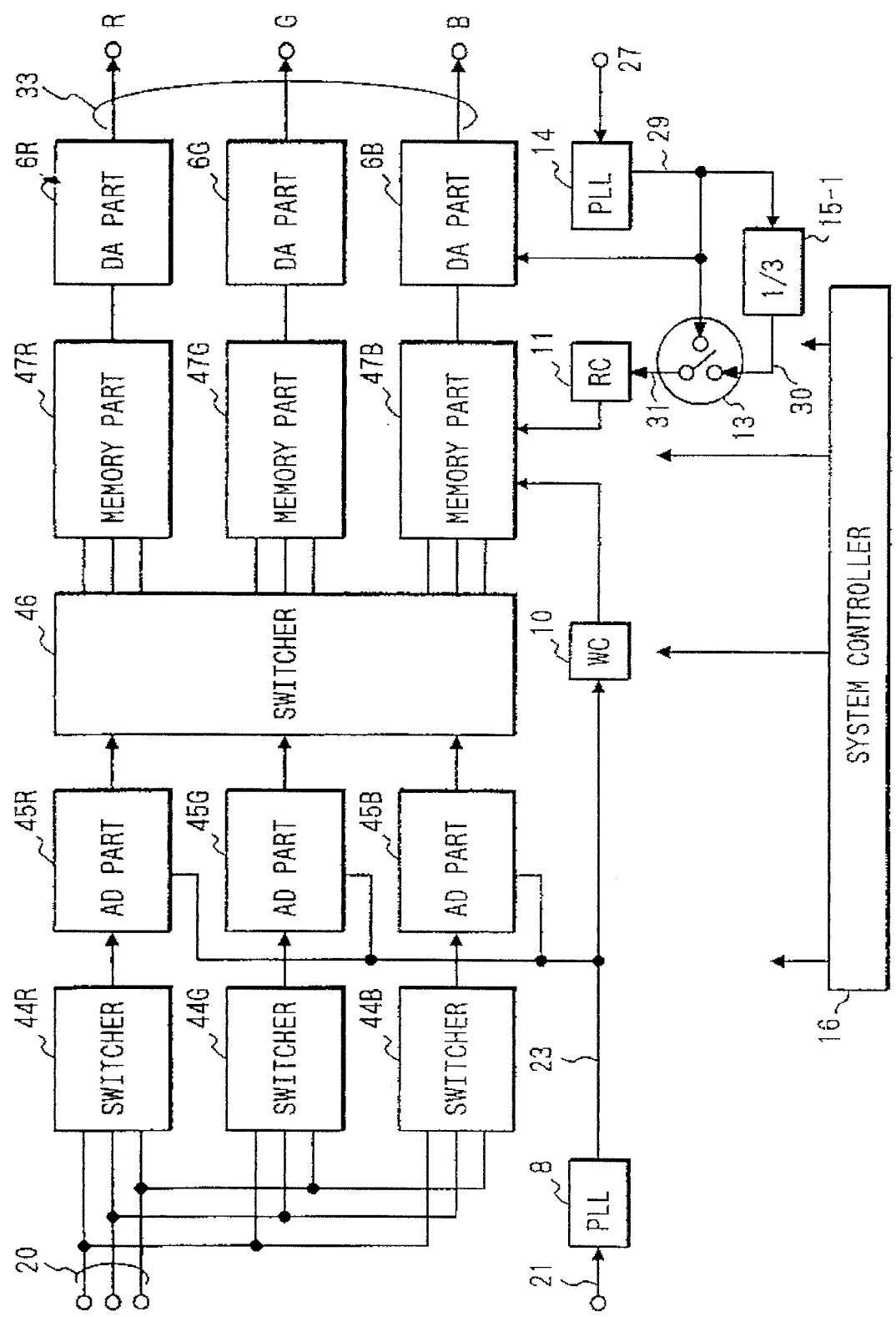
FIG. 5 is a block diagram showing a second embodiment according to the present invention.
Figure 6:
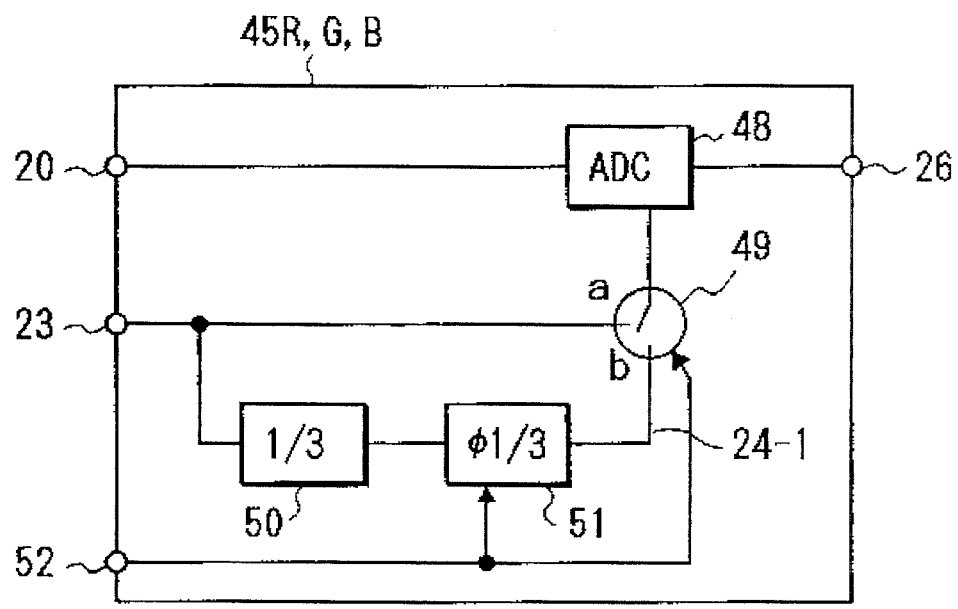
FIG. 6 is a detailed illustration of part of FIG. 5.
Figure 7:
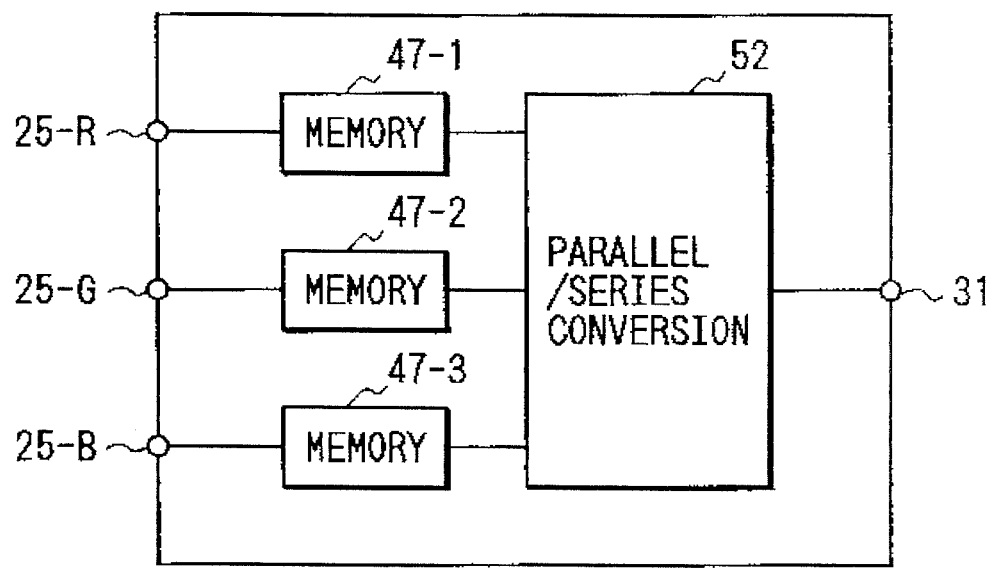
FIG. 7 is a detailed illustration of part of FIG. 5.

FIG. 5 is a block diagram of the image processing circuit for sampling video signals RGB of three colors, that is, red, green and blue, in three fields for respective colors; FIG. 6 is a circuit diagram of an analog to digital converter; and FIG. 7 is a circuit diagram of the memory part shown in FIG. 5.

The image processing circuit according to this embodiment comprises a PLL circuit 8 for generating a picture element clock 23 of a video signal from a horizontal sync signal 21; switchers 44R, 44G and 44B for changing over the video signals RGB for three colors (red, green and blue); analog to digital converters 45R, 45G and 45B for three colors for sampling video signals RGB selected by switchers 44R, 44G and 44B; a switcher 46 for selecting one of the memory parts 47R, 47G and 47B for write operation of image data digitized by the analog to digital converters 45R, 45G and 45B memory parts 47R, 47G and 47B for storing the image data; a write control circuit 10 for controlling writing of image data into the memory parts 47R, 47G and 47B; a read control circuit 11 for controlling reading of image data from memory parts 47R, 47G and 47B; a PLL circuit 14 for generating a picture element clock 29 from a horizontal sync signal 27; a clock divider 15-1 for dividing the picture element clock 29 generated by the PLL circuit 14 into three clock segments; a switch 13 for selecting the picture element clock 29 from the PLL circuit 14 or the divided clock 30 from the clock divider 15-1; digital to analog converters 6R, 6G and 6B the three colors of the image data RGB for converting image data read out from the memories to analog signals according to the picture element clock 29 generated by the PLL circuit 14; and a system controller for controlling the system. FIG. 6 shows an example of the analog to digital converters 45R, 45G and 45B, each of which comprises a clock divider 50 for dividing the clock into three clock segments, a phase shifter 51 for shifting the phase of the picture element clock, which is divided into three segments by the clock divider 50, by 120 degrees, a switcher 49 for changing over the picture element clock 23 and the divided clock 24-1, and an analog to digital converter 48. FIG. 7 shows an example of the internal construction of a memory part 47 which comprises three channel memories 47-1, 47-2 and 47-3 and a parallel to serial converter 52 for converting 3-phase parallel data to serial data. The operation is described below.

In this image processing apparatus, the image sampling method differs with the relationship between the picture element clock of the input video signal and the operable frequency for the analog to digital converters.

Figure 8:
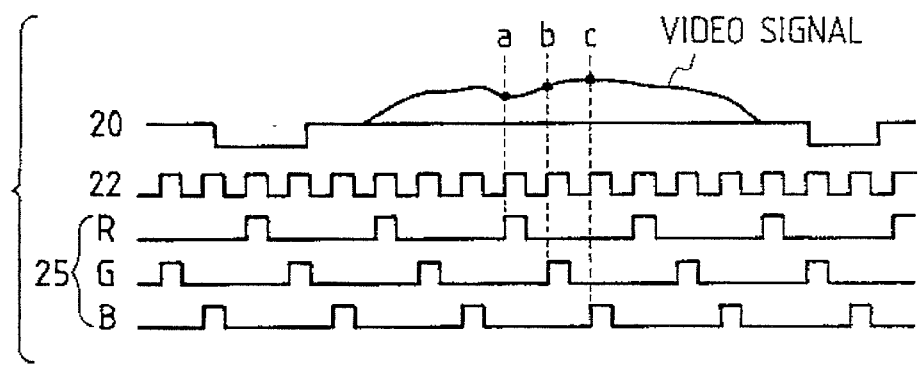
FIG. 8 is a timing diagram illustrating operation in FIG. 5.

In a case where the frequency of the picture element clock of the input signal is higher than the maximum operation frequency of the analog to digital converters, switchers 44R, 44G and 44B select one color of the three colors R, G and B, and output video signals for only that color to the analog to digital converters 45R, 45G and 45B. The picture element clock 23 regenerated by the PLL circuit 8 based on the horizontal sync signal 21 of the video signal is inputted to the analog to digital converters. In this case, the switcher 49 of each respective analog to digital converter selects the terminal b, whereby the picture element clock 23 is divided into three clock segments by the clock divider 50, and the three divided clocks which are divided by the clock divider 50 are used as the sampling clocks for respective analog to digital converters by effecting a shifting by as much as 0 degree in the analog to digital converter 45R, 120 degrees in the analog to digital converter 45G, and 240 degrees in the analog to digital converter 45B. As shown in FIG. 8, the sampling clocks 25 in the analog to digital converters 48 of the analog to digital converter part have the phases 25-R, 25-G and 25-B, which are respectively shifted, and therefore the whole sampling resolution can be made to correspond to a resolution for as much as three times the data for the respective analog to digital converters. In this sampling method, however, sampling is limited only to one of the R, G and B signals within the time of one field and therefore three fields are required for inputting three colors. For writing image data into the memories, the memories parts for the R, G and B signals are selected in the sequence of 47R, 47G and 47B for each vertical sync signal in terms of the field by the switcher 46 provided in the latter stages of respective analog to digital converters, and the data sampled by the respective analog to digital converters is separately stored in a plurality of memories of the selected memories part. For example, the case where the switcher 46 selects the memory part 47R is described referring to FIG. 7. Data 25-1 of the analog to digital converter 45R is written in the memory 47-1, data 25-2 of the analog to digital converter 45G is written in the memory 47-2, and data 25-3 of the analog to digital converter 45B is written in the memory 47-3. In other words, the same color data is stored in one memory part. When image data of three colors is lined up in respective memories, image data of the memory parts 47R, 47G and 47B are read out simultaneously. In this case, data written in the memories is taken out in the order of the addresses and rearranged in the sequence of the series video signals in the parallel to serial converters 52. RGB image data thus read out is converted to analog data in respective digital to analog converters 6R, 6G and 6B, respectively, for R, G and B colors and is outputted as an image.

On the other hand, in a case where the speed of the picture element clock is slower than the speed of the operation clock of the analog to digital converter 45, the switchers 44R, 44G and 44B select the RGB video signals so that the video signals to be inputted into analog to digital converters 45R, 45G and 45B, respectively, become other color video signals and the video signals are inputted to the analog to digital converter parts, respectively. The switcher 9 in each analog to digital converter selects the terminal a, uses the picture element clock 23 of the video signal as the sampling clock for the analog to digital converter 48 and sampling and analog to digital conversion are carried out. Image data, which is simultaneously sampled for three colors, is written in the memory parts 47R, 47G and 47B for respective color data R, G and B selected by the switcher 46. In other words, the image data sampled in the analog to digital converter 45R is written in the memory part 47R, the image data sampled in the analog to digital converter 45G is written in the memory part 47G, and the image data sampled in the analog to digital converter 45B is written in the memory part 47B. The image data is simultaneously read out from the memory parts, converted to analog signals by the digital to analog converters 6R, 6G and 6B, and outputted.

In addition to the above two embodiments, other processing can be added to further decelerate the write clock to the memories after analog to digital conversion by a serial to parallel conversion sequence circuit, which is additionally provided, and other processing can be done by a circuit which carries out image processing, such as expansion and compression, after writing data in the memories.

A third embodiment of the present invention will be described with reference to FIG. 9. This embodiment represents an image processing apparatus for processing video signals after analog to digital conversion as 4-phase parallel image data.

Figure 9:
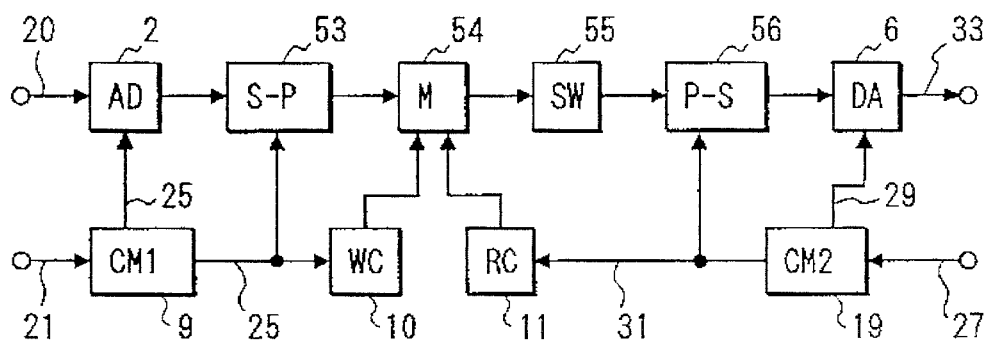
FIG. 9 is a block diagram of an image processing, apparatus showing a third embodiment of the present invention.
Figure 10:
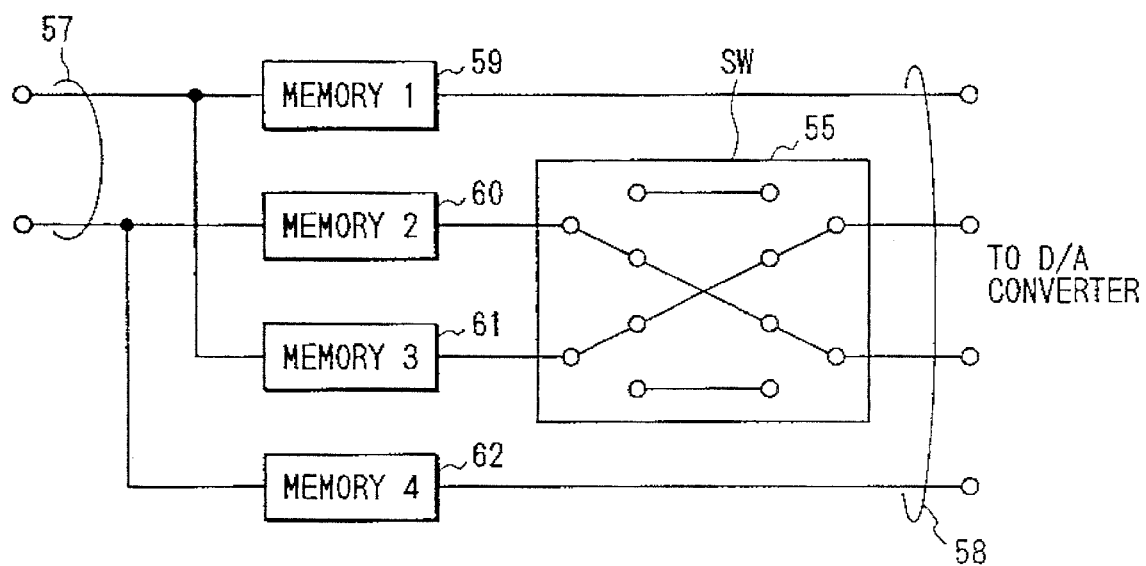
FIG. 10 is a circuit diagram of a memory part and a switching part of the third embodiment.

FIG. 9 is a circuit schematic diagram showing an image processing apparatus which comprises an input side clock generator 9 similar to that of the first embodiment; an analog to digital converter part 2; a serial to parallel converter part 53 for converting digital signals to 2-phase parallel signals; a memory part 54 which operates in parallel in four phases; a write control circuit 10 for controlling writing of data into the memories; a read control circuit 11 for controlling reading of data from the memories; a switching part 55 for exchanging two signal lines; a serial to parallel converter part 56 for converting 4-phase parallel signals to serial signals; a digital to analog converter part 6 for converting digital signals to analog signals; and an output side clock generator 19 for generating a read clock 29. In this case, the input side clock generator 9 and the output side clock generator 19 in this embodiment are used with the n value equal to 2 as in the first embodiment. FIG. 10 is a practical schematic diagram of the memories of this embodiment, comprising the 4-phase field memory part 54 composed of four memories 59 to 62 and the switching part 55 for exchanging data of the memories. The switching part 55 does not exchange the data when the terminal a is selected and exchanges the data only when the terminal b is selected.

Operation of the image processing apparatus according to the third embodiment is described below.

In this embodiment, since the value of n of the clock divider 17 and the phase shifter 18 of the input side clock generator 9 is determined to be 2, the output clock 25 of the input side clock generator 9 is as described below. Specifically, in a case where the frequency of the picture element clock 23 of the video signal 20 is lower than the operable frequency for the analog to digital converter of this image processing apparatus, the picture element clock 23 is outputted, whereas, in a case where the frequency of the picture element clock 23 of the video signal 20 is higher than the operable frequency for the analog to digital converter, a 2-divide clock 24 is outputted. In this case, the 2-divide clock 24 is outputted as being shifted by a half cycle for each vertical sync signal 22. The output clock 25 thus selected is used as a sampling clock for the analog to digital converter part 2. In this embodiment, the image data sampled in the analog to digital converter part 2 is further parallel-processed to reduce the operation of the memories. In this case, the video signals digitally converted by the analog to digital converter part 2 is converted to parallel signals in two phases and the operation clock frequency of video signals for the memories is processed to ½ of the picture element clock 23. These serial to parallel converted video signals are written by as many as two phases into the memories part 54 in two write methods, one for sampling in one field and the other for sampling in two fields. These two methods are described with reference to FIGS. 11 and 2.

Figure 11:
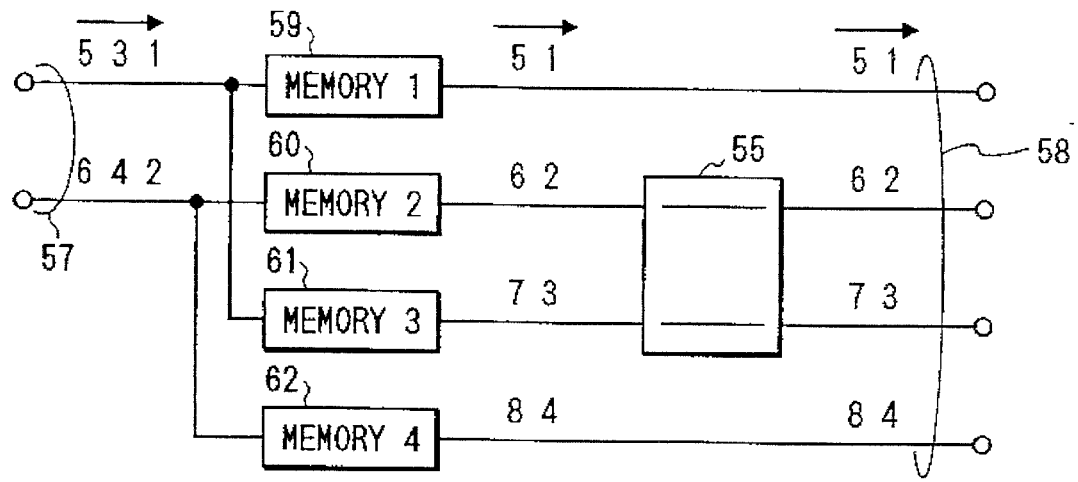
FIG. 11 is a circuit diagram showing the flow chart of image data when an image is fetched in one field of the third embodiment.

A method for fetching the image into the memory when video signals are taken into one field is described below. FIG. 11 is an illustration for taking the video signals into one field. The numerals shown in FIG. 11 denote picture elements, that is, upper row numerals denote the picture elements of the odd number fields and the lower row numerals denote the picture elements of the even number fields. The picture elements to be inputted into the memories are parallel 2-phase data 57 which is converted as 1 and 2, 3 and 4, 5 and 6, . . . by the serial to parallel converters part 53 and alternately written in a circulation mode where picture elements 1 and 2 are written in memories 59 and 60 with the first clock, picture elements 3 and 4 are written in memories 61 and 62 with the following clock, picture elements 5 and 6 are written in memories 59 and 60 with the further following clock, . . . . The video signals to be inputted in two phases are thus converted to 4y-phase parallel data by the memories part 54. Data is simultaneously read out from the four memories 59 to 62, respectively, and 4-phase image data is inputted into the switching part 55. This switching part 55 selects a switch terminal a shown in FIG. 10 and the data is not replaced. After this, parallel 4-phase output data 58 is converted to serial data from four phases to one phase and outputted as analog data by the digital to analog converter part 6.

Figure 12:
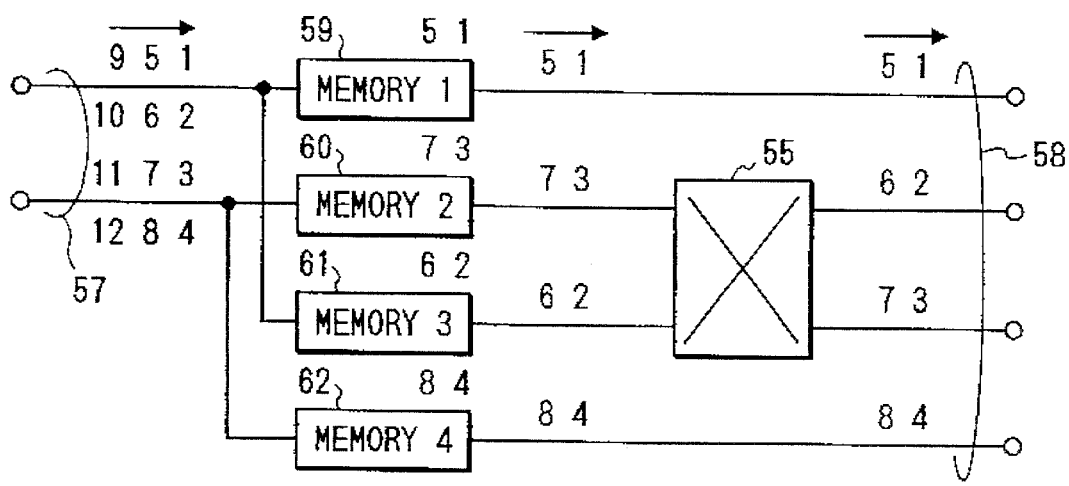
FIG. 12 is a circuit diagram showing the flow of image data when an image is fetched in two fields of the third embodiment.

On the other hand, when fetching video signals across two fields, an analog to digital converted image is thinned every other picture element and sampled, and therefore parallel 2-phase input data 57 after serial to parallel conversion is 1 and 3, 5 and 7, 9 and 11, . . . in the odd number fields and 2 and 4, 6 and 8, 10 and 12, . . . in the even number fields. The image data flow is shown in FIG. 12 wherein the upper row numerals denote the picture elements of the odd number fields and the lower row numerals denote the picture elements of the even number fields. The write control circuit 10 (not shown) writes parallel data 1 and 3, 5 and 7, . . . in the memories 59 and 60 for the odd number fields and image data 2 and 4, 6 and 8, 10 and 12, . . . in the memories 61 and 62 for the even number fields. On the other hand, the read control circuit 11 (not shown) of the memory simultaneously reads out the image data inputted as described above from the four memories 1 to 4 with the read clock, and the orders of the second phase and third phase image data, that is, the image data of the memories 60 and 61 are reversed in the switching part 55 and outputted. In this case, the read clock is a 4-divide clock of the output clock 24. Image data of which the second phase and the third phase have been reversed in the switching part 55 and outputted are converted to analog signals by the digital to analog converter part 6 shown in FIG. 9 and outputted. Thus the image data is written as 2-phase parallel data in the memories and converted to 4-phase image data by the memories part. The memory structure can be the same as the parallel to serial conversion circuit structure, that is, the number of memories both in the case of fetching image data in one field and in the case of fetching image data in two fields are the same due to use of the data reversing switch outside the memories. Accordingly, the two sampling methods of the first embodiment are greatly advantageous in that the circuit for reading the data from the memories can be simplified and the operation clock of the memory can be reduced.

Figure 13:
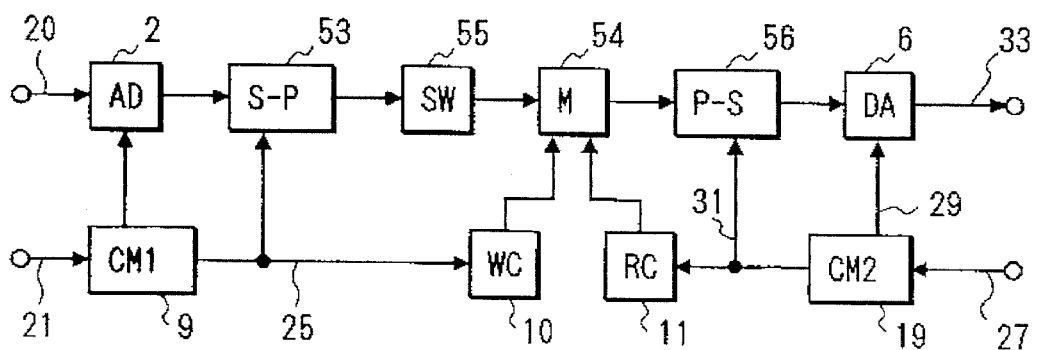
FIG. 13 is a block diagram constructional view of an image processing apparatus showing a fourth embodiment of the present invention.
Figure 14:
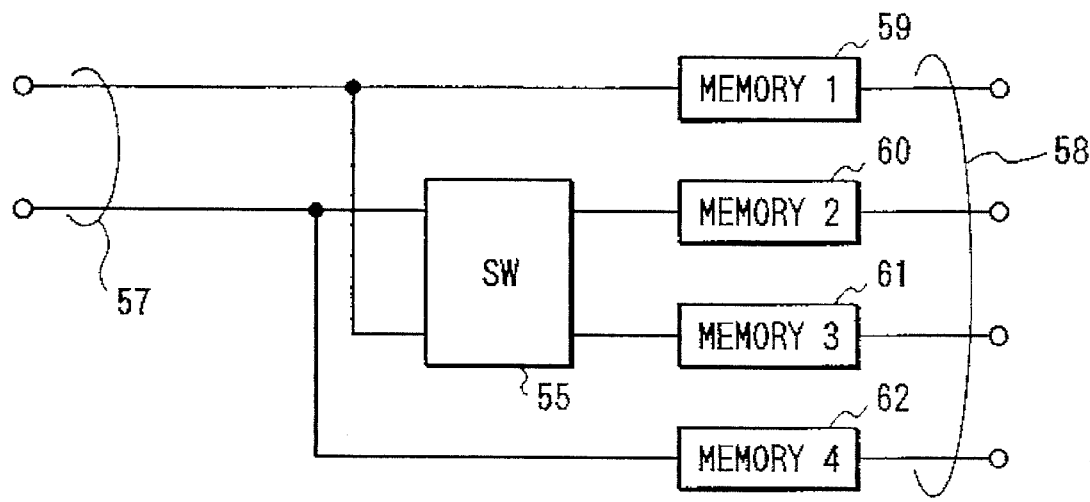
FIG. 14 is a circuit diagram of a memory part and a switching part of the fourth embodiment.

A fourth embodiment will be described with reference to FIG. 13, which shows an image processing apparatus according to the present invention. This image processing apparatus of the fourth embodiment comprises the input side clock generator 9; the analog to digital converter part 2; the serial to parallel converter part 53 which parallel-converts digital signals in two phases; the switching part 5 for reversing the orders of data; the memory part 54; the write control circuit 10 for controlling write operation of data into the memory part 54; the read control circuit 11 for controlling read operation of data from the memories; the parallel to analog converter part 56 for converting 4-phase parallel signals to serial signals; the digital to analog converter part 6; and the output side clock generator 19 for generating the picture element for output 29 from the horizontal sync signal 27. A detailed construction of the memory part 54 composed of the memories 59 to 62 and the switching part 55 for reversing data is shown in FIG. 14. As in the third embodiment, the switching part 55 does not reversing data when the terminal a is selected and reverses data only when the terminal b is selected.

The operation of the fourth embodiment will be described.

As in the third embodiment, a clock 25 outputted from the input side clock generator 9 on the basis of the horizontal sync signal 21 and the picture element clock 23 of the video signal is used as an operation clock for the analog to digital converter part 2 and the write control circuit 10. The video signals which have been converted to digital form in the analog to digital converter part 2 are converted to 2-phase signals in the serial to parallel converter part 53 and written for every two phases in the memory part 54. The operations which have been described above are the same as those of the third embodiment. The difference from the third embodiment is that the operation for reversing the orders of data is carried out when the video signals are to be written in the memory part 54. In other words, the fourth embodiment is featured in that a data reversing switch is provided in the former stage and the data reversing operation in reading from the memories is eliminated.

Operations of the-switching part 55 and the memory part 54 are as described below. When fetching image data in one field, the switching part 55 selects a switch so that the orders of data are not reversed. In other words, the switching part 55 selects the terminal a.

Figure 15:
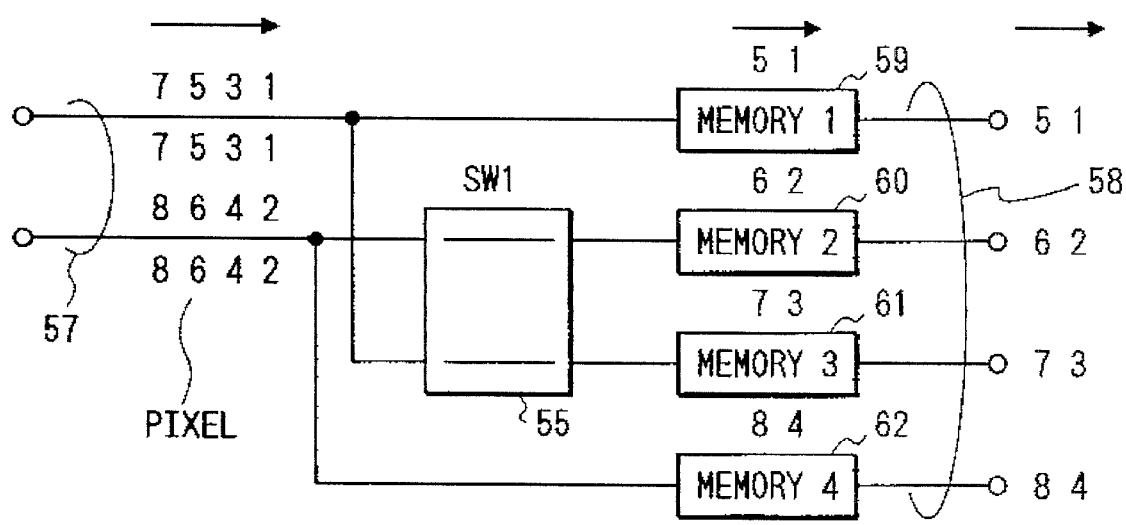
FIG. 15 is a circuit diagram showing the flow of image data when an image is fetched in one field of the fourth embodiment.
Figure 16:
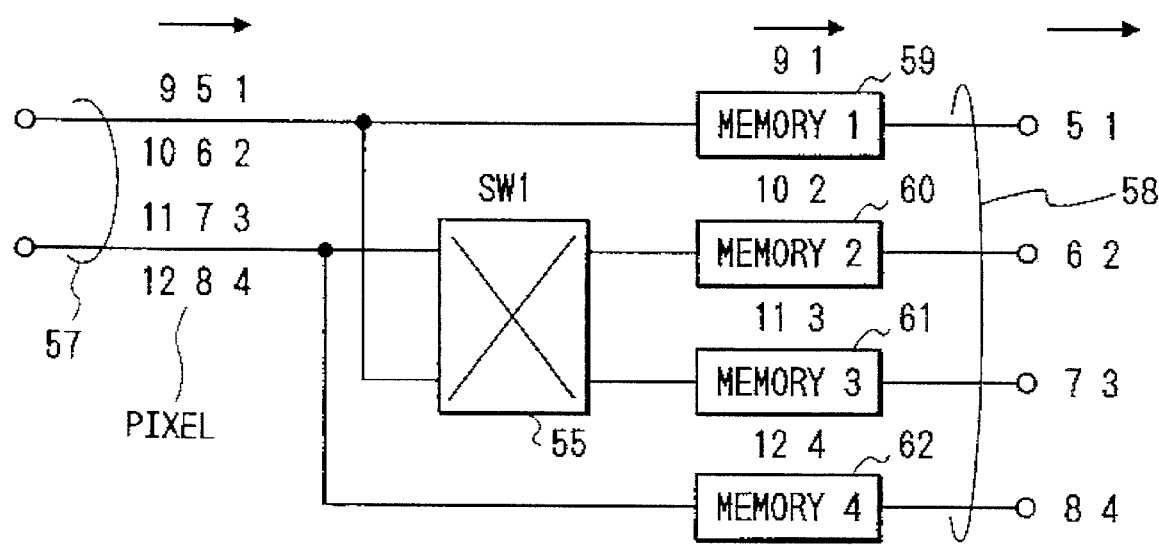
FIG. 16 is a circuit diagram showing the flow of image data when an image is fetched in two fields of the fourth embodiment.

Data flow to the memories is as shown in FIGS. 5 and 16. FIG. 15 shows the flow of image data when fetching the image in one field and FIG. 16 shows the flow of image data when fetching the image in two fields. Respective circuits have the same arrangement as shown in FIG. 14. When fetching video signals in one field, the picture elements to be inputted are 1 and 2, 3 and 4, 5 and 6, . . . as shown in FIG. 15 and, since all switches select the terminal a, image data is not reversed. The control is such that the data inputted in two phases is written by alternately selecting the memories 59 and 60 and the memories 61 and 62 with each write clock, for example, the memories 59 and 60 with the first clock, the memories 61 and 62 with the following clock, the memories 59 and 60 with the further following clock, . . . . In this case, the write clock is ½ of the parallel clock. Thus, the 2-phase video signals are converted to 4-phase parallel signals in the memory part. Read operation of data from the memories is controlled by the read control circuit 10 so that the data of four phases is read simultaneously from the four memories 59 to 62 and 4-phase image data read out is converted from four phases to one phase by the parallel to serial converter part 56 and outputted as analog data by the digital to analog converter part 6.

On the other hand, when fetching video signals across two fields, the switching part 55 always selects the terminal b. As shown in FIG. 16, picture elements of the first field, such as 1 and 3, 5 and 7, 9 and 11, which are parallel-converted in two phases are written in the memories 59 and 60 of the memory part, respectively. The picture elements of the following field are 2 and 4, 6 and 8, 10 and 12, . . . and written in the memories 61 and 62. Therefore, the picture element data is written in sequence in the memories 59 to 62, as shown in FIG. 16. The data thus inputted is simultaneously read out from four memories 59 to 62 using the first read clock by the read control circuit 11. Those 4-phase parallel video signals thus read out are converted to 1-phase serial video signals by the parallel to serial converter part 56, further converted to analog signals by the analog to digital converter part 6 and outputted. In this case, as in the first embodiment, the data is always read out in four phases from the memories without using two sampling methods and parallel to serial conversion can be a single processing.

The above third and fourth embodiments respectively show an example of the image processing apparatus which processes the signals in four phases. Processing is the same for general higher order phases as 2n phases instead of four phases and n phases instead of two phases.

Figure 17:
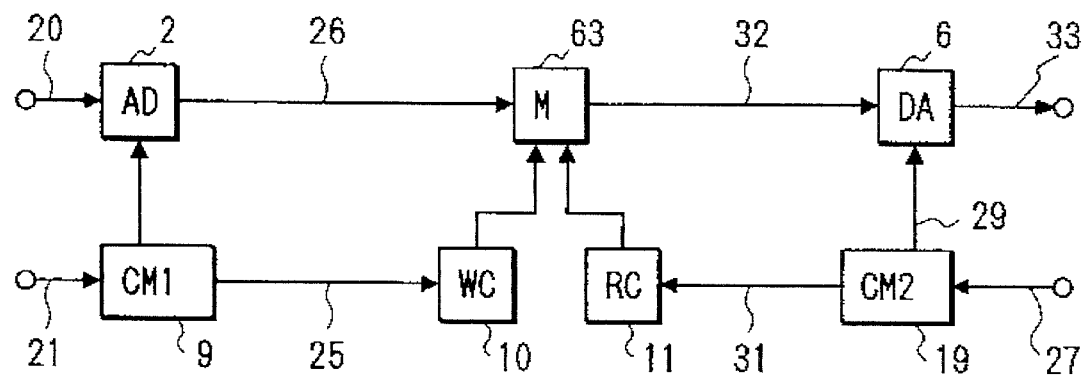
FIG. 17 is a block diagram of an image processing circuit of a fifth embodiment of the present invention.

A fifth embodiment will be described with reference to FIG. 17. An image processing apparatus according to the fifth embodiment comprises the analog to digital converter part 2; an input side clock generator 9; the memory part 63; a digital to analog converter part 6; the read side PLL circuit (not shown); the write control circuit 10; and the read control circuit 11. The operations of the component parts other than the memory part 63, the write control circuit 10 and the read control circuit 11 are the same as in the above-described embodiments. This embodiment is characterized in the control of the memory part.

Figure 18:
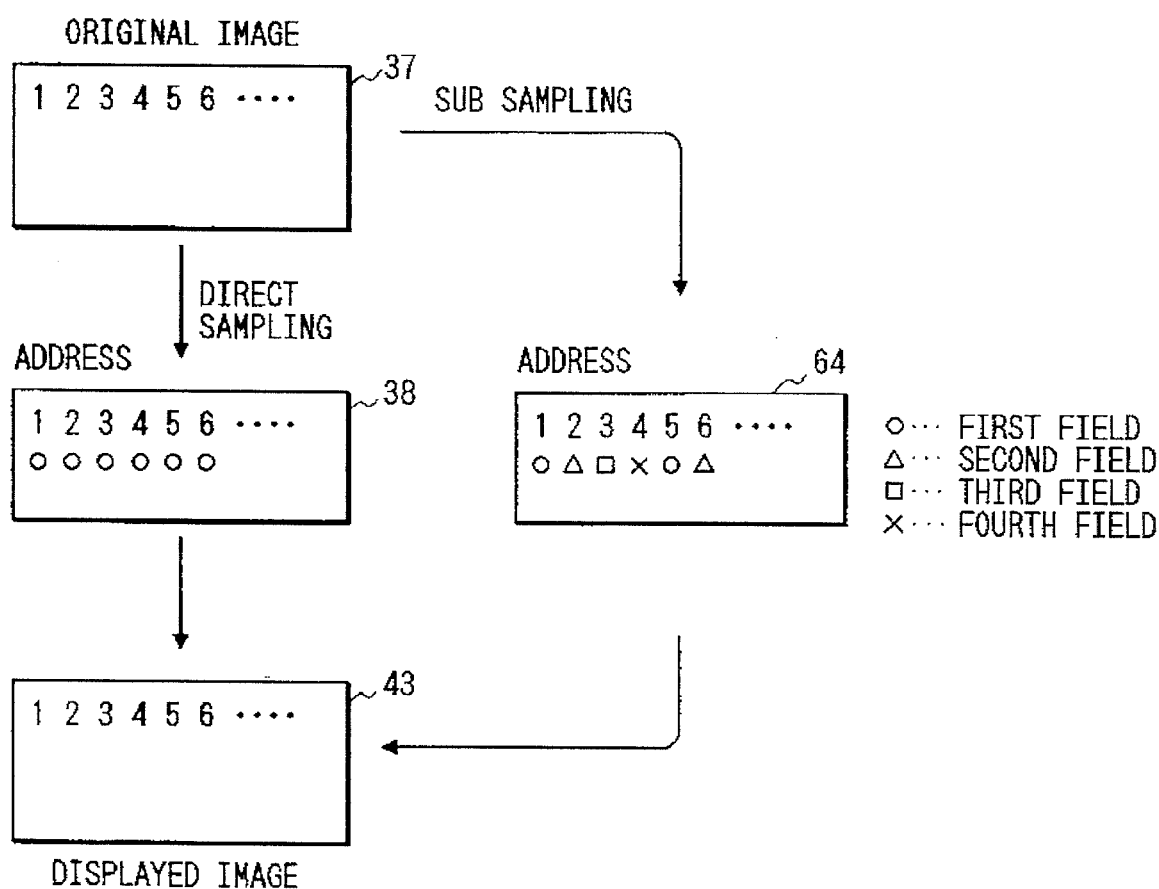
FIG. 18 is a diagram showing the operation of a memory of the fifth embodiment.

Operation of the memory part 63 of this embodiment is described below. In this embodiment, for fetching image data for each picture element as in the first step of the first embodiment, image data is sequentially stored in the memory as in the first embodiment shown with 38 in FIG. 18. On the other hand, for fetching image data in a plurality of fields of plural picture elements as in the second step, image data is stored in the memory according to the write control so that the image data is written for every other one of the plural addresses and consequently the image data is written by changing the write address for each field. In other words, FIG. 18 shows the picture element data 64 in the memory when one image is to be fetched in four fields. The image data stored in the memory can be read out in the sequence of addresses of the memory by thus shifting the write addresses for each field, and therefore the image data can be reproduced as the original picture on the addresses of the memory. In this case, it is clear that a similar processing can be carried out even by parallel conversion after analog to digital conversion as in the third and fourth embodiments.

Further, in the first to fifth embodiments, there can be included a method for automatically selecting a video signal discrimination circuit and an animation/still picture discrimination circuit, which are additionally provided, as means for fetching the image in one field or as means for fetching the image across a plurality of fields. Descriptions of the animation/still picture discrimination circuit and the video signal frequency discrimination circuit are omitted since these circuits are not related to the present invention.

Many different embodiments of the present invention may be constructed without departing from the spirit and scope of the invention, It should be understood that the present invention is not limited to the specific embodiments described in this specification, To the contrary, the present invention is intended to cover various modifications and equivalent arrangements included within the spirit and scope of the claims.

What is claimed is:

1. An image processing apparatus, having means for storing input video signals in a plurality of memories after analog to digital conversion of the input video signals in an analog to digital converter, means for reading out the contents of said memories for image processing and means for displaying an image on a display unit after digital to analog conversion of image-processed input video signals in a digital to analog converter, comprising:

a PLL circuit for regenerating a picture element clock signal according to horizontal sync signals obtained from said input video signals;

first clock means for supplying said picture element clock signal outputted from said PLL circuit;

second clock means for dividing said picture element clock signal outputted from said PLL circuit, shifting a phase of the divided clock signal in response to vertical sync signals obtained from said input video signals and supplying said shifted clock signal; and changeover means for changing over between said first clock means and said second clock means in accordance with a frequency of said input image signals so as to output said picture element clock signal supplied by said first clock means or said shifted clock signal supplied by said second clock means as a sampling clock to said analog to digital converter.

2. An image processing apparatus according to claim 1, wherein said second clock means comprises means for dividing said picture element clock signal outputted from said PLL circuit into three clock segments, means for generating three divided clock signals with different phases by shifting the phases of said divided clock signals by 120 degrees and means for outputting said divided clock signals as sampling clock signals for three types of analog to digital converters for R, G and B colors; and when said changeover means selects said second clock means, said three types of analog to digital converters R, G and B colors respectively sample the same color video signals in respective fields and sample three color video signals in a time of three fields.

3. An image processing apparatus according to claim 1, further comprising:

means for discretely writing sampled video signals for respective fields in said plurality of memories provided in a latter stage of said analog to digital converter;

first output means for directly outputting data read out from said plurality of memories to said digital to analog converter when said changeover means selects said first clock means; and second output means for outputting data read out from said plurality of memories to said digital to analog converter after rearranging said data in the sequence of the input video signals in parallel to serial conversion when said changeover means selects said second clock means.

4. An image processing apparatus according to claim 1, further comprising means for writing image data, which is analog to digital converted in said analog to digital converter, in the memories at every other one of a plurality of addresses; and means for fetching data of one image in a plurality of fields when said changeover means selects said second clock means.

5. An image processing apparatus according to claim 1, wherein said changeover means selects the first clock means when said input video signals are animation video signals and selects the second clock means when said input video signals are still video signals.

6. An image processing apparatus according to claim 1, wherein the image processing apparatus forms an image expansion unit of a multi screen system for displaying images on a plurality of screens.

7. An image processing apparatus, having means for storing input video signals in memories after analog to digital conversion of the input video signals in an analog to digital converter, means for reading out the contents of said memories for image processing and means for displaying an image on a display unit after digital to analog conversion of said image-processed input video signals in a digital to analog converter, comprising:

a PLL circuit for regenerating a picture element clock signal according to horizontal sync signals obtained from said input video signals;

first clock means for supplying said picture element clock signal outputted from said PLL circuit;

second clock means for dividing said picture element clock signal outputted from said PLL circuit, shifting a phase of the divided clock signal in response to vertical sync signals obtained from said input video signals and supplying said shifted clock signal;

changeover means for changing over between said first clock means and said second clock means in accordance with a frequency of said input image signals so as to output said picture element clock signal supplied by said first clock means or said shifted clock signal supplied by said second clock means as a sampling clock to said analog to digital converter; and means for serial to parallel converting analog to digital converted image data which is provided in a latter stage of said analog to digital converter.

8. An image processing apparatus according to claim 7, wherein said serial to parallel converting means converts said analog to digital converted image data to n-phase parallel data and comprises:

write control means for controlling writing of all n-phase data of said n-phase parallel data in a memory for parallel-processing said data in 2n phases;

read control means for controlling reading of data, which is written in all n-phases in said memory, in 2n phases;

switching means for replacing the orders of said read-out 2n-phase parallel data; and parallel to serial converter means for converting said 2n-phase parallel data, the orders of which are replaced, to serial data;

where n is an integer.

9. An image processing apparatus according to claim 7, wherein said serial to parallel converter means converts said analog to digital converted image data to n-phase parallel data and comprises:

switching means for replacing the orders of said n-phase parallel data;

write control means for controlling writing of all n-phase data of said n-phase parallel data in a memory for parallel-processing said data in 2n phases;

read control means for controlling reading of data, which is written in all n-phases in said memory, in 2n phases; and parallel to serial converter means for converting said read-out 2n-phase parallel data to serial data;

where n is an integer.

10. An image processing apparatus according to claim 7, wherein the image processing apparatus forms an image expansion unit of a multi screen system for displaying images on a plurality of screens.

11. An image processing apparatus, having means for storing input video signals in memories after analog to digital conversion of the input video signals in an analog to digital converter, means for reading out the contents of said memories for image processing and means for displaying an image on a display unit after digital to analog conversion of said image-processed input video signals in a digital to analog converter, comprising:

a PLL circuit for regenerating a picture element clock signal according to horizontal sync signals obtained from said input video signals;

first clock means for supplying said picture element clock signal outputted from said PLL circuit;

second clock means for dividing said picture element clock signal outputted from said PLL circuit, shifting a phase of the divided clock signal in response to vertical sync signals obtained from said input video signals and supplying said shifted clock signal;

first changeover means for changing over between said first clock means and said second clock means in accordance with a frequency of said input image signals so as to output said picture element clock signal selected by said first clock means or said shifted clock signal supplied by said second clock means as a sampling clock signal to said analog to digital converter;

means for serial to parallel converting analog to digital converted image data which is provided in a latter stage of said analog to digital converter; and second changeover means for sampling clock signals supplied to said digital to analog converter by changing over a picture element clock signal to be outputted by the PLL circuit or a clock signal produced by n-dividing said picture element clock signal according to a horizontal sync signal of the output video signal;

where n is an integer.

12. An image processing apparatus according to claim 11, wherein said second changeover means changes over a sampling clock signal to be outputted to said digital to analog converter in response to an operable frequency at said analog to digital converter.

13. An image processing apparatus according to claim 11, wherein said second changeover means selects said picture element clock signal for output in a case where the frequency of said input signal is lower than an operable frequency for said analog to digital converter, and selects a clock signal produced by n-dividing said picture element clock in a case where the frequency of said input signal is higher than the operable frequency for said analog to digital converter.

14. An image processing apparatus comprising:

means for storing input video signals in memories after analog to digital conversion of the input video signals in an analog to digital converter;

means for reading out the contents of said memories for image processing;

means for displaying an image on a display unit after digital to analog conversion of said image-processed input video signals in a digital to analog converter; and changeover means for selecting a clock signal to be inputted to said analog to digital converter from at least two kinds of clock signals in response to a frequency of said input video signals.

15. An image processing apparatus according to claim 14, where said changeover means selects one of two kinds of clock signals.

16. An image processing apparatus according to claim 14, wherein said changeover means changes over a clock signal to be outputted to said analog to digital converter in response to one of a high and low frequency of said input video signals with respect to an operable frequency of said analog to digital converter.

17. An image processing apparatus according to claim 14, wherein said changeover means selects a picture element clock signal of said input video signal or a clock signal produced by dividing and phase shifting said picture element clock signal of said input video signal.

18. An image processing apparatus according to claim 14, wherein said changeover means selects said picture element clock signal of said input signal in a case where the frequency of said input video signals is lower than an operable frequency of said analog to digital converter, and selects a clock signal produced by dividing and phase shifting said picture element clock signal of said input signal in a case where the frequency of said input video signals is higher than the operable frequency of said analog to digital converter.

19. An image processing apparatus according to claim 14, wherein said analog to digital converter enables sampling of a HDTV input video signal, and said digital to analog converter enables conversion of an ultra-high precision still video signal.

20. An image processing apparatus according to claim 14, wherein said changeover means enables a changeover operation in response to a frequency of said input video signals being one of higher and lower with respect to operable frequencies of said memories.

* * * * *